US011509685B2

(12) United States Patent
Jaladi et al.

(10) Patent No.: US 11,509,685 B2
(45) Date of Patent: Nov. 22, 2022

(54) CYBERATTACK PREVENTION SYSTEM

(71) Applicant: PAYPAL, INC., San Jose, CA (US)

(72) Inventors: Kishore Jaladi, Fremont, CA (US); Jeffrey Alan Edelen, Fort Collins, CO (US); Sundar Amalan Vincent, San Jose, CA (US); Lakshmikanth Raghavan, Milipitas, CA (US); Santhosh Jagadeesan, San Jose, CA (US); Hari Hara Balan Shanmugasundaram, Tracy, CA (US); Abhishek Chhibber, Sunnyvale, CA (US); Darshan Desai, Fremont, CA (US); Oliver J. Reyes, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 11 days.

(21) Appl. No.: 17/171,809

(22) Filed: Feb. 9, 2021

(65) Prior Publication Data

US 2021/0258341 A1 Aug. 19, 2021

Related U.S. Application Data

(63) Continuation of application No. 16/254,325, filed on Jan. 22, 2019, now Pat. No. 10,917,430, which is a continuation of application No. 15/199,863, filed on Jun. 30, 2016, now Pat. No. 10,187,421.

(60) Provisional application No. 62/346,490, filed on Jun. 6, 2016.

(51) Int. Cl.
*H04L 29/06* (2006.01)
*H04L 9/40* (2022.01)
*G06F 8/65* (2018.01)

(52) U.S. Cl.
CPC .......... *H04L 63/1458* (2013.01); *G06F 8/65* (2013.01); *H04L 63/1416* (2013.01); *H04L 63/067* (2013.01)

(58) Field of Classification Search
CPC ............ H04L 63/1458; H04L 63/1416; H04L 63/067; G06F 8/65
See application file for complete search history.

(56) References Cited

U.S. PATENT DOCUMENTS

| | | | |
|---|---|---|---|
| 7,643,468 B1 | 1/2010 | Arregoces | |
| 8,095,961 B1 * | 1/2012 | Morley | ............... H04L 63/20 726/4 |
| 8,179,906 B1 | 5/2012 | Rogers | |
| 8,266,692 B2 * | 9/2012 | Wenzinger | ............ G06F 21/575 717/173 |
| 8,312,270 B1 * | 11/2012 | Chou | .................. H04L 63/101 713/168 |
| 8,739,287 B1 * | 5/2014 | Polyakov | ............ H04L 63/1441 726/25 |
| 9,311,066 B1 | 4/2016 | Garman | |
| 9,749,354 B1 | 8/2017 | Diggins | |
| 10,469,526 B2 | 1/2019 | Jaladi et al. | |
| 10,187,421 B2 | 11/2019 | Jaladi et al. | |

(Continued)

Primary Examiner — John B King
(74) Attorney, Agent, or Firm — Haynes & Boone, LLP

(57) ABSTRACT

A self-updating system for defending against a cyberattack requests connected devices to solve a problem that is created in a random manner. The problems are created in a manner such that the system can determine whether the client device is being used as part of a cyberattack based on how the client device responds to the problems.

20 Claims, 5 Drawing Sheets

(56) References Cited

U.S. PATENT DOCUMENTS

| | | | |
|---|---|---|---|
| 10,474,813 B1* | 11/2019 | Ismael | G06F 21/54 |
| 10,917,430 B2 | 2/2021 | Jaladi et al. | |
| 2003/0217270 A1 | 11/2003 | Nakayama | |
| 2004/0243994 A1 | 12/2004 | Nasu | |
| 2006/0031937 A1* | 2/2006 | Steinberg | G06F 21/565 |
| | | | 726/24 |
| 2006/0070129 A1* | 3/2006 | Sobel | H04L 63/105 |
| | | | 726/23 |
| 2006/0278694 A1* | 12/2006 | Jha | G06F 21/54 |
| | | | 235/379 |
| 2007/0300215 A1 | 12/2007 | Bardsley | |
| 2008/0189788 A1* | 8/2008 | Bahl | H04L 63/1416 |
| | | | 726/25 |
| 2009/0222811 A1* | 9/2009 | Faus | G06F 8/65 |
| | | | 717/173 |
| 2009/0222907 A1* | 9/2009 | Guichard | H04L 63/1408 |
| | | | 726/17 |
| 2010/0094806 A1 | 4/2010 | Apostolides et al. | |
| 2011/0265153 A1 | 10/2011 | Guccione et al. | |
| 2012/0030762 A1 | 2/2012 | Klein et al. | |
| 2012/0155349 A1 | 6/2012 | Bajic et al. | |
| 2014/0230020 A1 | 8/2014 | Mogaki | |
| 2014/0283051 A1 | 9/2014 | Doron | |
| 2014/0317754 A1* | 10/2014 | Niemela | G06F 21/6227 |
| | | | 726/26 |
| 2015/0096020 A1 | 4/2015 | Adams et al. | |
| 2015/0100660 A1 | 4/2015 | Flack et al. | |
| 2015/0213251 A1 | 7/2015 | Turgeman | |
| 2016/0248809 A1 | 8/2016 | Smith et al. | |
| 2016/0344765 A1 | 11/2016 | Shiell et al. | |
| 2017/0070534 A1 | 3/2017 | Bailey et al. | |
| 2017/0374028 A1* | 12/2017 | Oliver | H04L 63/1416 |
| 2017/0374097 A1 | 12/2017 | Kish | |
| 2017/0374098 A1 | 12/2017 | Kish | |
| 2019/0342326 A1 | 11/2019 | Jaladi et al. | |

* cited by examiner

CYBERATTACK PREVENTION SYSTEM

CROSS-REFERENCE TO RELATED APPLICATIONS

This application is a continuation of U.S. patent application Ser. No. 16/254,325, filed Jan. 22, 2019, issued as U.S. Pat. No. 10,917,430 on Feb. 9, 2021, which is a continuation of U.S. patent application Ser. No. 15/199,863, filed Jun. 30, 2016, issued as U.S. Pat. No. 10,187,421 on Jan. 22, 2019, and which claims priority to U.S. Provisional Patent Application No. 62/346,490, filed Jun. 6, 2016. This application is also related to application Ser. No. 15/199,845, filed Jun. 20, 2016, issued as U.S. Pat. No. 10,469,526 on Nov. 5, 2019, all of which are incorporated herein by reference in their entirety.

TECHNICAL FIELD

The present disclosure generally relates to information security, and more specifically, to a system and method of detecting network communications associated with cyberattacks and preventing them.

BACKGROUND

As cyberattacks have evolved overtime, more and more complex cybersecurity systems have been developed to defend against the evolving cyberattacks. However, one consequence to these complex cybersecurity systems is that they may be computationally intensive and slow. These cybersecurity systems may be poor at analyzing data communications for a cyberattacks in a timely manner. Additionally, many internet services require real time or near real time responses to client communications and conducting rigorous analysis of every internet communication is unfeasible or unrealistic. Furthermore, these internet services often handle large quantities of data received for a large number of client devices. A computational intensive cybersecurity system could easily be overloaded by having to analyze a large number of client communications conducted simultaneously. This also opens the system up to certain forms of cyberattacks focused on overloading a system, such as a distributed denial of service attack. Thus, it would be desirable if there were a system that quickly detected certain types of cyberattacks to reduce the load on a more computationally intensive cybersecurity system. The embodiments disclosed below address this desire and also provide other advantages.

Figure 1:
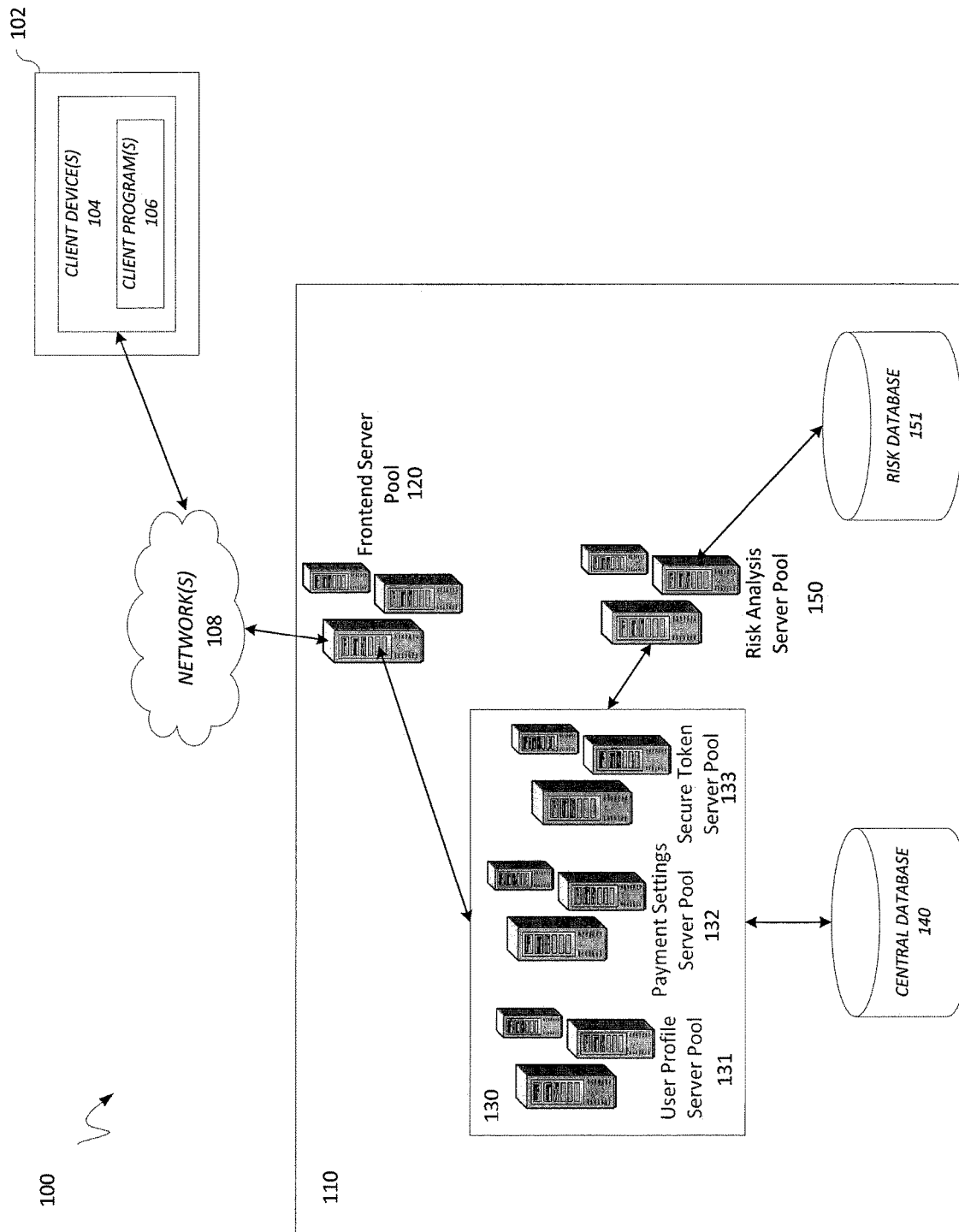
FIG. 1 is a block diagram of an exemplary computing environment adapted for implementing one or more cyberattack prevention measures.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some examples, a system and method for preventing cyberattacks is provided. In some examples, devices that connect with the system are requested to solve a problem before the system responds to any communications from the device. Requesting the connected device to solve a problem helps to ensure that the device is not configured to conduct a cyberattack. For example the device has to be configured to robustly enough to solve the problem. Devices that use standard browsers such as Internet Explorer®, Mozilla®, Chrome®, and/or the like would be capable of solving the problems through the functionality of the browser. In contrast, a device configured to send lots of requests, such as those that are part of a distributed denial of service attack, may be scripted and stripped with very little functionality such that is can efficiently conduct a cyberattack, such as a denial of service attack. The device that has been stripped down to its most basic and necessary functionalities would not be able to solve the problem or provide a response. As such, when a solution is not provided by the device, the system can ignore communications from that device.

In some examples, the problem that is provided to the device for solving may be created randomly by the system. In some examples, the system may select problems from a pool of simple problems and aggregate them in a random manner. Some exemplary simple problems are discussed in more detail below, but an exemplary simple problem may be a simple mathematical operation, such as turning a base 10 number into a base 64 number. The system may select a number of those problems at random to create an aggregated problem for the device to solve.

Furthermore, to increase the number of different possible aggregated problems that the system can create, the system may be able to select a plurality of different ways to combine and/or order the selected problems with different mathematical operations. For example if P1 was a first function/problem, P2 was a second function/problem, and P3 was a third function/problem, the system may be able to randomly create a problem such as P1(P2+P3)*P3 (e.g. the answer to this problem would be the solution of the solution of P2 plus the solution of P3 used to solve P1 multiplied by the solution of P3), wherein each of P1, P2 and P3 are random problems picked by the system, and the operators of +, * or which solutions or values are used as the value to solve P1 are also selected at random. For example, another problem with random problems and random operators in random orders may look like the following: P3(P2(P1))+P3. The number of problems used for aggregation can be randomized, the problems used to create the aggregated problem can be randomized, the operations can be randomized, the order can be randomized, and how the problems are nested can be randomized. In this manner, there are a large number of very different problems that the system may be able to create such that a system configured to conduct a cyberattack would have to be programmed to be fairly robust in information handling. This is a large deterrent for certain types of attacks. For example having a system run a cyberattack program with a lot of complexity reduces its capabilities and efficiency in conducting overload type attacks.

In some examples, the problems may be provided to the device as an executable, such as a Javascript® executable. Most normal devices have the capability of executing a Javascript® executable through an installed web browser or other application; however, devices configured to conduct cyberattacks may not have a web browser or an application for running an executable. For examples, a device configured to conduct a cyberattack may be limited to running a script and incapable of running an executable provided by a system. Thus, normal devices that are not designed to conduct a cyberattack would have no problem solving the problem, but other devices configured to conduct a cyberattack may fail this test. Furthermore, the test, through the number of combinations and permutations of different problems, is robust enough that a table of solutions cannot be created for the system to solve as a response as the number of possible problems is exponentially large.

In some examples, the system may also provide the client device with a random constant to be used to solve the problems. The constant may be a random number, or may be a number dependent on the user device. For example, the problem may request that a value associated with the MAC address, IP address, device identifier, password, username, and/or other device information be used to solve the problem. In some examples, the constant value may be based on user telemetry such as accelerometer readings, location information, gyroscope readings, mouse movement readings, historical click data, and/or the like. In some examples, the constant may be a combination of the previously disclosed information through concatenation, a mathematical operation, and/or the like. Some of the information may be acquired using a third-party API, such as the Android® or iOS® APIs, such that the information may be difficult to fake. In some examples, the problem may implement multiple constant values for solving the problem and the constant values may be determined randomly.

In this manner, the system may be able to determine whether the device has the capabilities of determining such information, but additionally, the system can ensure a random answer is not being provided. Further still, since the system may provide the problem in an executable, the executable may cause the device to solve the problem in a manner that the system selected, e.g. use the functions that the executable calls upon to solve a problem. The executable may cause the device to determine the MAC address, IP address, device identifier, password, username, and/or other device information using a function call selected by the system associated with an application selected by the system. For example, the system may request that information be determined using the function call of a web browser, a browser plugin, or another application function. As such, the cyberattack device would have to either have the application installed and running on the device or determine what the function is designed to determine and then determine that information before attempting to solve the problem. As there are many different functionalities of a web browser, the cyberattacking device would essentially have to have complete functionality of a web browser, operating system, and/or another applications to conduct a cyberattack. Such functionality would significantly reduce the efficiency of the attacking device and often will not be within the capabilities of a device configured for a cyberattack. In some examples, the executable may use a function from a system-provided plugin to obtain a constant value for solving a problem. The plugin may record information about the device that it is installed on for authentication purposes and/or identification of the user and/or user device. Additionally, the system may keep track of the number of plugins that are installed on different devices with a particular username or account, such that the system can detect whether an unusual number of installations have been made or if there are an unusual number of requests being made with a particular account. The plugin may provide a hashed identifier for the user and/or user device as part of a constant value such that the system can determine the user and/or device from the solution of the problem. The system can also check to see if the system has a record of the device or user identifier. Furthermore, the plugin would make it difficult for a hacker to determine what the function is doing, solving, and/or how the constant from the plugin is determined for use in the problem. The system, however, would be able to always solve the problem as it is the creator of the problem and would have all the necessary values to determine the correct answer of a problem for comparison with the solution provided by the device, if a solution is provided. In cases where a correct solution is provided, the system may continue through the normal flows of responding to the communications from the user device. Otherwise, the system may ignore the communications for the device. In this manner, the system may reduce the load of other servers in the system from responding to communications associated with cyberattacks, such as one or more severs configured to conduct a more rigorous fraud detection analysis on communications that the system receives.

Furthermore, the system may include one or more systems or mechanisms such that the preventative measures may be bypassed for preauthorized devices. As discussed below, one option would be to provide a token that can be provided in lieu of solving the problem.

In some examples, a system for cyberattack prevention includes a non-transitory memory storing instructions and one or more hardware processors coupled to the non-transitory memory and configured to read the instructions from the non-transitory memory to cause the system to perform operations. In some examples, the operations include receiving a system request from a client device; in response to the request, selecting a plurality of problems, at least one of the plurality of problems being randomly selected from a pool of problems; selecting a plurality of operations, at least one of the plurality of operations being randomly selected from a pool of operations; creating an aggregated problem using the plurality of problems and plurality of operations, a solution to the aggregated problem being dependent on a constant variable; sending the aggregated problem to the client device; receiving, from the client device, a client solution; and responding to the system request from the client device in response to the client solution matching the solution to the aggregated problem.

In some examples, a computer implemented method is disclosed. In some examples, the method includes receiving a system request from a client device; in response to the request, selecting a plurality of problems, at least one of the plurality of problems being randomly selected from a pool of problems; selecting a plurality of operations, at least one of the plurality of operations being randomly selected from a pool of operations; creating an aggregated problem using the plurality of problems and plurality of operations, a solution to the aggregated problem being dependent on a constant variable; sending the aggregated problem to the client device; receiving, from the client device, a client solution; and responding to the system request from the client device in response to the client solution matching the solution to the aggregated problem.

In some examples, a non-transitory machine readable medium is disclosed. In some examples, the non-transitory machine readable medium stores machine readable instructions executable to cause a machine to perform operations. In some examples, the operations include receiving a system request from a client device; in response to the request, selecting a plurality of problems, at least one of the plurality of problems being randomly selected from a pool of problems; selecting a plurality of operations, at least one of the plurality of operations being randomly selected from a pool of operations; creating an aggregated problem using the plurality of problems and plurality of operations, a solution to the aggregated problem being dependent on a constant variable; sending the aggregated problem to the client device; receiving, from the client device, a client solution; and responding to the system request from the client device in response to the client solution matching the solution to the aggregated problem.

FIG. 1 illustrates, in block diagram format, an exemplary embodiment of a computing environment adapted for implementing one or more cyberattack prevention measures. As shown, computing environment 100 may comprise or implement a plurality of servers, devices, and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing environment 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 generally may comprise one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing environment 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and/or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

Network-based system 110 may comprise one or more groups of servers or server pools for conducting one or more functionalities. A server pool may be one or more servers designated for conducting one or more functionalities, such as some of the functionalities discussed below and/or other functionalities depending on the services provided by network-based system 110. In some examples, network-based system 110 includes one or more frontend severs in the frontend server pool 120. Frontend server pool 120 may provide suitable interfaces that facilitate some of the communications between client devices 104 and one or more servers of network-based system 110 using various modes of communication.and/or via one or more networks 108. Frontend server pool 120 may include a web server, an API server, a messaging server, and/or the like which may provide interfaces to one or more severs of application servers 130 for handling one or more services of network-based system 110. In some examples, frontend server pool 120 may provide an authorization fa9ade for authenticating the client device and/or users for one or more services, such as client 102 or client devices 104. Although not shown, server pool 102, in some examples, may be communicatively linked with risk analysis server pool 150 to send device information associated with server attacks and/or receive updates to one or more filters that may be handled by frontend server pool 120.

Application servers 130 of network-based system 110 may be structured, arranged, and/or configured to provide various online services, account management, monetary transfers, checkout processing, user authentication, data gathering, data analysis, and/or other services to users that access network-based system 110. In some examples, such as when network-based system is configured as a payment handling service, application server 130 may have a user profile server pool 131, payment settings server pool 132, and secure token server pool 133. Although in this example network-based system 110 has server pools associated with a payment system, any other system may be used and are contemplated. For example, other implementations of networked-based system 110 may provide gaming services, social media service, and/or the like. Each of the other implementation may comprise other servers and/or server pools configured to provide different functionalities depending on the services provided. As such, user profile server pool 131, payment settings server pool 132, and secure token server pool 133 are provided for ease of reference and as examples. It is contemplated that other network-based systems may have different servers that conduct different functionalities.

In various embodiments, client devices 104 and/or third-party devices may communicate with application servers 130 of network-based system 110 via one or more servers of the frontend server pool 120. It may be appreciated that frontend server pool 120 may be structured, arranged, and/or configured to communicate with various types of client devices 104, other third-party devices and third-party applications, and/or client programs 106 and may interoperate with each other in some implementations.

In some examples, application servers 130 may be coupled to and in communication with a central database 140. Central database 140 may generally store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments. In some examples, instead of a central database 140, a distributed database may be used. In some examples, multiple different databases may be used depending on the different functionalities and capabilities of each server of application severs 130. For example, user profile server pool 131, payment settings server pool 132, and secure token server pool 133 may have their own dedicated databases.

In some examples, application servers 130 may be coupled to and communicate with a risk analysis server pool. The risk analysis server pool 150 may be one or more servers configured to review and/or analyze requests and communications from client devices 104 and determine whether any of the requests and communications are fraudulent or part of a cyberattack. In some examples, risk analysis server pool may implement one or more fraud detection algorithms and/or machine learning algorithms to detect fraudulent actions and/or cyberattacks. In some examples, application servers 130 may determine how to handle a request from client device 104 depending on the response or whether a response is received from the risk analysis server pool. In some examples, analyzing the risk of a request from client devices 104 may be computationally intensive for risk analysis server pool 150 in relation to the number of requests that application severs 130 receives from client devices 130. As such, each of the servers and/or server pools of application servers 130 may selectively determine which types of requests from client devices 104 are sent to risk analysis server pool 150 for fraud and/or cyberattack detection.

In some examples, risk analysis server pool 150 may be coupled to and in communication with a risk database 151. Central database 151 may generally store and maintain various types of information for use by risk analysis server pool 150 and may comprise or be implemented by various types of computer storage devices (e.g., servers, memory) and/or database structures (e.g., relational, object-oriented, hierarchical, dimensional, network) in accordance with the described embodiments. In some examples, instead of a central database 140, a distributed database may be used.

Figure 2:
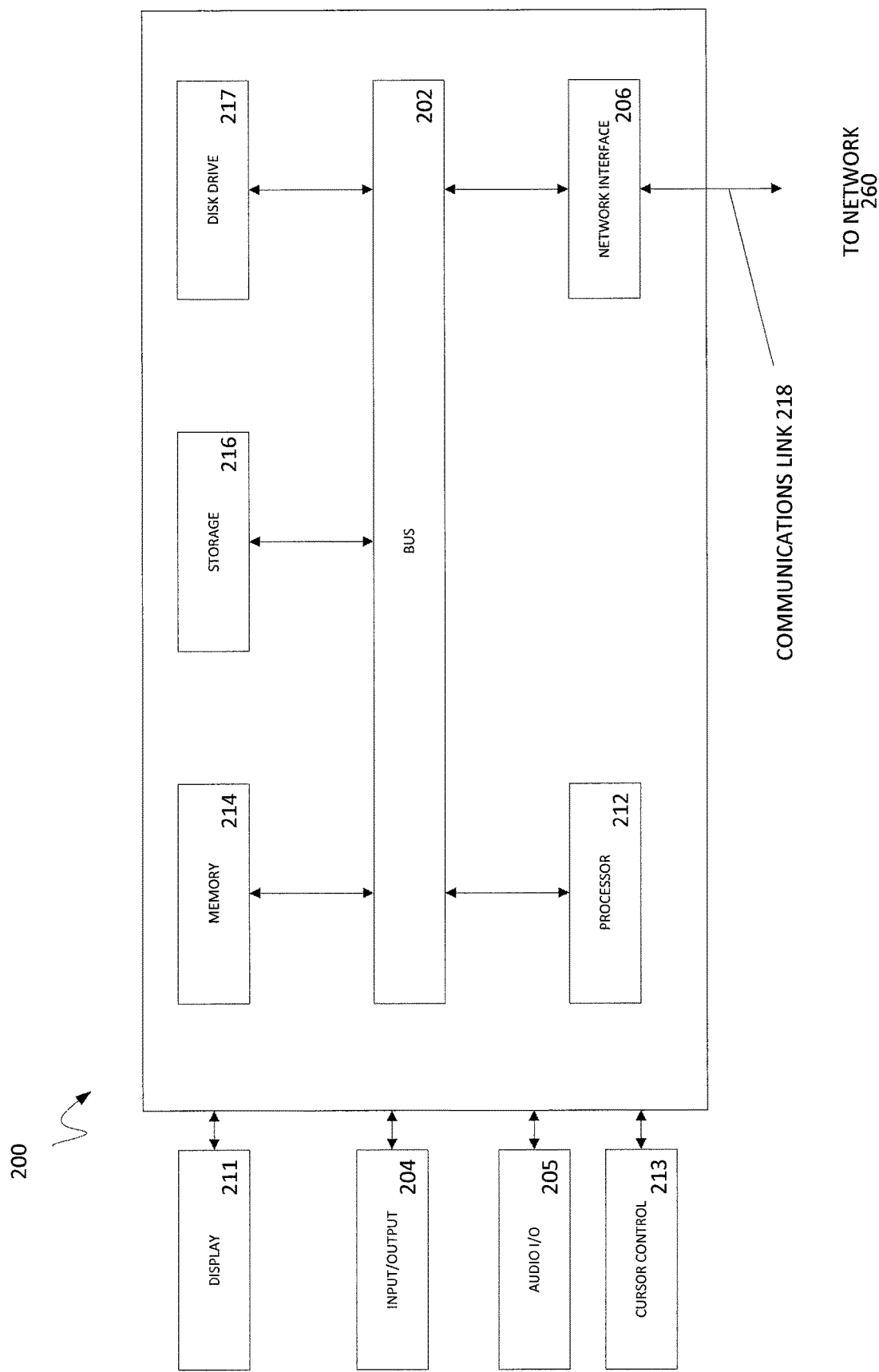
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touch screen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3A:
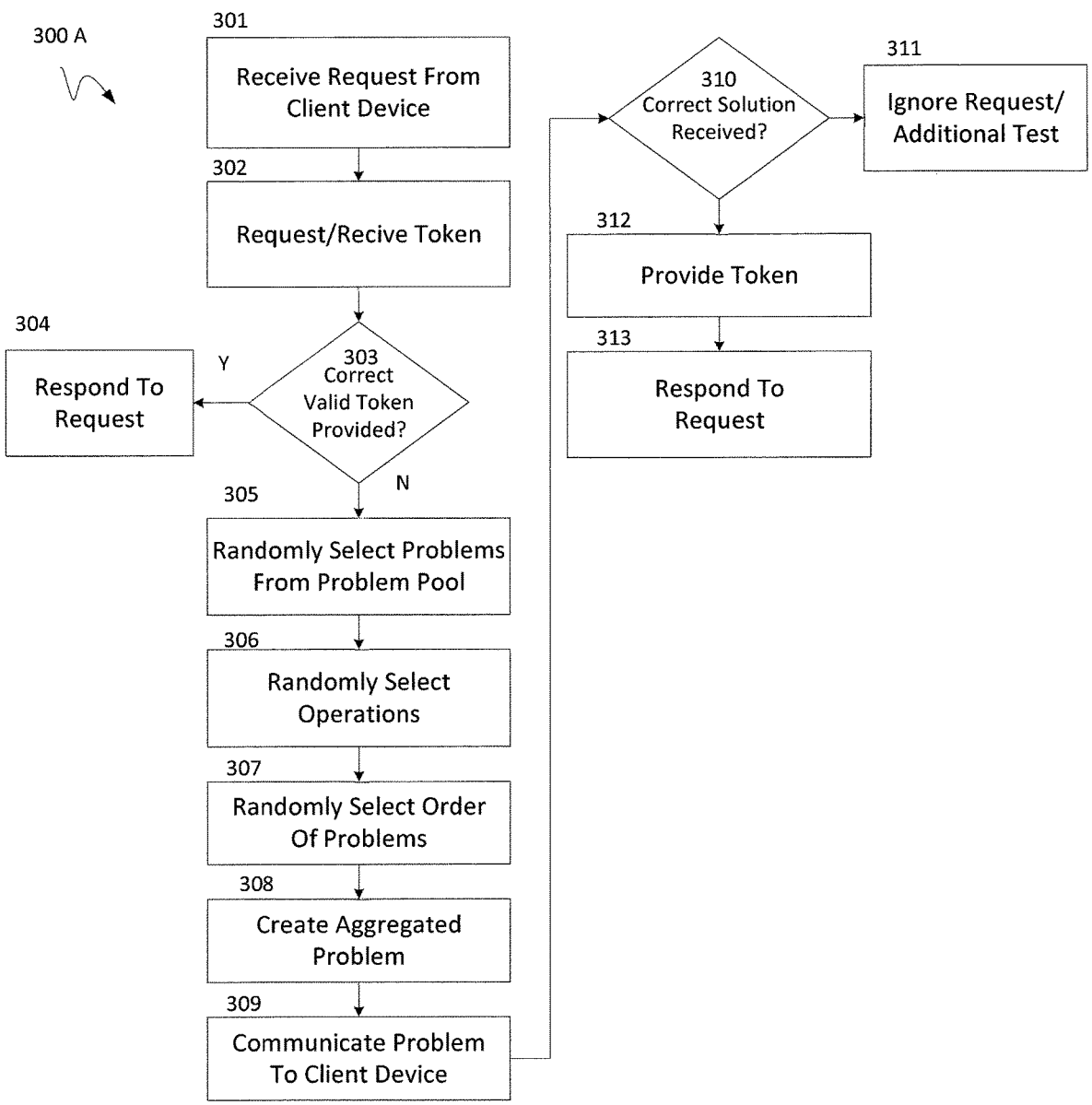
FIG. 3A is a flow diagram illustrating an exemplary process for defending a cyberattack.

FIG. 3A illustrates an exemplary process 300A implemented by a system for defending a cyberattack on the system such as a denial of service attack. Process 300A may be implemented on a system such as one or more of the systems in the computing environment of FIG. 1, such as network-based system 110, according to some embodiments. In some examples, process 300A may be implemented on one or more of the server pools of FIG. 1, such as frontend server pool 120, user profile server pool 131, payment settings server pool 132, security token server pool 133, risk analysis server pool 150, and/or the like. In some examples, process 300A may be implemented in its own separate server or server pool. In some examples, process 300A may be distributed over several server pools. In some examples, process 300A may be implemented in frontend server pool 120 or between frontend sever pool 120 and application servers 130 such that an attack can be stopped from using server resources downstream.

In some examples, process 300A may be a computationally efficient cyberattack deterrent system that may be less robust than a more rigorous cyberattack deterrent, such as that may be implemented by system 100 of FIG. 1. As such, process 300A may be a first line of defense against cyberattacks and may be implemented by one or more servers towards the front of the hierarchy of servers that interact with client devices, such as frontend server pool 120. Process 300A may act as a coarse filter on requests and communications from client devices to preserve resources of a more rigorous and computationally intensive cybersecurity system and prevent an overload of the overall system. For example, a distributed denial of service attack may overload a more rigorous cybersecurity system, such as risk analysis server pool 150, which may implement machine learning, large neural networks, and/or other computationally intensive fraud detection systems. Process 300A may be implemented in front of the more rigorous cybersecurity system to filter client requests such that the computationally intensive fraud detection system is not overloaded.

According to some embodiments, process 300A may include one or more of operations 301-313, which may be implemented, at least in part, in the form of executable code stored on a non-transitory, tangible, machine readable media that, when run on one or more hardware processors, may cause a system to perform one or more of the operations 301-313.

In some examples, process 300A may include operation 301. At operation 301, the system may receive a request from a client device. In some examples, the request may be a request that the system run a function. Some exemplary functions may include authorizing a login, authorizing monetary transfer, providing access to a webpage hosted by the system, looking up and providing user information, accessing a database, and/or other system functions. In some cases, the request may be used as part of a distributed denial of service scheme designed to overload the system with requests. In some cases, the system may implement a fraud detection application, which the system may also be implementing in addition to process 300A, designed to detect fraudulent or unauthorized use of the system. Additionally, in some cases, a denial of service attack may be aimed at the fraud detection application. In other examples, the denial of service attack may aimed at overloading other functions, servers, databases, and/or the like. In some examples, process 300A may be implemented to prevent a cyberattack on the system. In some examples process 300A may ensure that the client device making the request is not a script or bot intended to overload the system.

In some examples, process 300A may include operation 302. At operation 302, the system may determine whether the client device has a token, such as an adaptive token, provided by the system. Operation 302 may be in response to one or more operations, such as operation 301. The token may signify whether the client device or a particular user associated with the client device has interacted with the system before, successfully conducted one or more operations of process 400 previous to sending the request in operation 301, and/or received a token from the system. In some examples, the token may include information indicative of the client device. The information indicative of the client device may be indicative of information such as a media access controller (MAC) address associated with the device, device ID, application ID, username, email, password, pin, and/or other information. In some examples, the information indicative of the client device may be a keyed-hash message authentication code (HMAC) of one or more of this information or another hash of the information. In some examples, the token may be a footprint of a device which establishes that the device previously interacted with the system. In some examples, the token may be browser specific and may store information in a cookie. To determine whether the device has a token, the system may request the token from the user device. In some examples the user device may provide the token as part of a communication or request. In some examples, the system may request the user device to perform an operation with the token and provide a response as proof that the system has a token.

In some examples, process 300A may include operation 303. At operation 303, the system may determine whether a correct token was provided by the client device or determine whether the client device has the correct token. The system may set a predetermined time limit for the client device to provide the token after the system requests the token at process 302.

In some examples, if a token is provided by the client device, the system may check to determine whether the token is fraudulent. In some examples, the system may request and/or determine one or more information about the client device. For example, the system may have created the token that it is requesting at operation 302, and the token may be a hash of one or more information about the client device. The system may request the information from the client device and determine whether the information used to create the token matches the information from the client device. In some examples, the system may request, from the client device, more information than it needs for authenticating the token. In this manner it would be more difficult to reverse engineer the hashing system because only the system would have record of the hash key, what information was used, and the order that the information was used to create the token.

The system may also determine whether the token is valid. For example, the system may invalidate one or more tokens based on previous determinations, by the system, that the token was used in a fraudulent manner. For example, the system may have previously determined that the token was used and/or shared with another client device or the system may have determined that the token was used as part of a cyberattack. The system may maintain a whitelist and/or blacklist of valid tokens or token keys for comparison with a token or token key associated with a client device to determine validity.

If the system determines that the client device has a valid token, the system may continue to operation 304 where the system may respond and/or execute to the request received at operation 301. Otherwise, if the system determines that a correct token was not provided (such as by expiration of the time limit), determines that the client device does not have a valid token, receives an invalid token, receives an incorrect token, and/or the like, the system may continue to operation 305.

Although in this example a token is used to determine whether the client device had successfully interacted with the system previously, other methods of determining whether the client device has successfully interacted with the system previously may be used and are contemplated as part of this disclosure.

In some examples, process 300A may include operation 305. In some examples, operation 305 may be in response to operation 303 determining that the client device does not have or has not provided a correct and valid token. At operation 305, the system may randomly select one or more problems from a predetermined pool of problems. The pool of problems may be one or more mathematical problems, such as turning a value into base 64, reversing the bits of a value (e.g. 10011 may turn into 11001), splitting and reversing the split (e.g. 11110000 may split into 1111 and 0000 and reversed to turn into 00001111), rotating or shifting the bits (e.g. 10101 may rotate to become 01011), and/or other mathematical problems.

In some examples, the system may have additional problems, changes to the problems, and/or different problems to be used or implement depending on whether the system determines or identifies an indication that the a particular cyberattack is breaching or circumventing the current problems. A more detailed discussion is provided below regarding changes to the cyberattack prevention system based on an identified breach.

In some examples, process 300A may include operation 306. At operation 306, the system may randomly select one or more operations to implement with the randomly selected problems at operation 305. Some exemplary operations may include addition, subtraction, multiplication, division, and/or other operations. In some examples, the operation may be to take a solution from one problem and have the solution of that problem to be used as part of a second problem, such as a constant value used in the second problem.

In some examples, process 300A may include operation 307. At operation 307, the system may randomly select the order in which the operations and/or the problems are conducted. The order may include the sequence of the problems, which problem or problems are associated with each operation, where the solutions of the problems are for an operation (e.g. denominator or numerator of a division), and/or the like.

In some examples, process 300A may include operation 308. At operation 308, the system may create an aggregated problem based on the randomly selected problems at operation 305, the randomly selected operations at operation 306, and/or using the randomly selected order at operation 307. In some examples, the aggregated problem may be an executable that a browser or application on the client device should be capable of executing. In some examples, the aggregated problem may be in Javascript® and/or one or more other programming languages. Furthermore the executable may provide information for one or more variables or constant values to be used in solving the agwegated problem. In some examples, the system may provide the constant value or values for use in solving one or more of problems. In some examples, the executable may be made such that the system determines the constant values based on device information, such as the MAC address, IP address, device, ID, password, and/or the like. In some examples, the executable may cause the system to determine the constant values using a particular function that the system expects to be on the device, such as a web browser, plugin, application, operating system, and/or the like. In cases where information about the device is used, the system may determine the information through the network connection, or request the information be provided by the device.

In some examples, process 300A may include operation 309. At operation 309, the system may communicate the aggregated problem created at operation 308 to the client device for solving and/or execution. In some examples, the system may communicate the aggregated problem over a network communication.

In some examples, process 300A may include operation 310. At operation 310, the system may wait for and determine whether a correct solution to the aggregated problem created at operation 308 was received from the client device. In some examples, the system may ignore the request at operation 311 until or unless a correct solution is received. In some examples, at operation 311 may provide a manual check that the client device is being operated by a human, such as a Captcha® request. A correct response to the Captcha® request or other manual human checking mechanism may result in the system continuing to operation 312 and/or 313. In contrast, when an incorrect or no response is given for the manual check, the system may ignore the request received at operation 301.

In some examples, process 300A may include operation 312. At operation 312, the system may, in response to receiving a correct solution, provide the client device with an authentication token. The authentication token may be proved to the system, such as at operation 302, the next time the client device requests the system to conduct an operation. The system may allow the client device to skip one or more processes of operation 300A and still receive a response from the system for future communications and/or requests from the client device.

In some examples, process 300A may include operation 313. At operation 313, the system may respond to the request received from the client at operation 301. In some examples, operation 313 may be conducted in response to receiving a correct solution at operation 310.

Figure 3B:
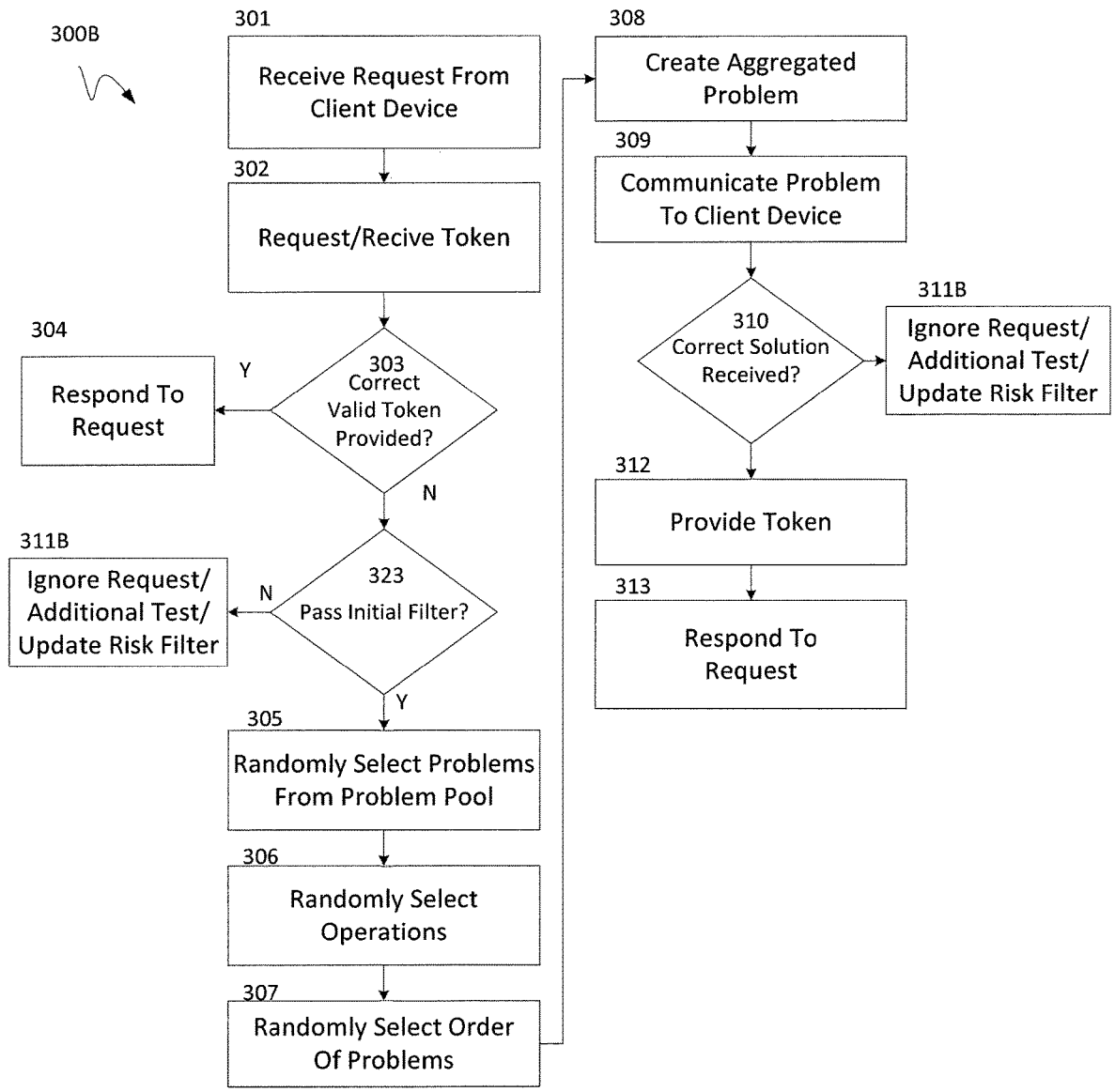
FIG. 3B is a flow diagram illustrating an exemplary process for defending a cyberattack.

FIG. 3B is a flow diagram illustrating an exemplary process 300B that implements an additional request filter to exemplary process 300A of FIG. 3A. Process 300B may have some or all of the same operation of 300A with the addition of operation 323. Although in process 300B operation 323 is placed to occur after operation 303 when the system determines that a correct and valid token was not provided, operation 323 may occur before operation 303 or at other points of operation 300B. Furthermore, process 300B may provide additional functions to operation 311 with operation 311B such that the filter in operation 323 can be updated and improved through machine learning.

In some examples operation 323 may be an additional filter to determine whether the request at operation 301 is from a human, an automated system, or a device conducting a cyberattack. In some examples, the system at operation 323 may analyze telemetry data received from the user device are indicative of human interaction. For example, the system may request or receive, from the client device, data associated with the user interacting with a touch screen, mouse, keyboard, and/or other input devices. In some examples, the system may receive other data such as gyroscope data, GPS location data, device usage data (e.g., browsing history, number of tabs open, number of applications used, battery life, time of last phone call, time of last text message, last time the device was charged, etc.), sequence of inputs and/or operations, and/or the like. The system may check for discrepancies in the telemetry data or indicators from the telemetry data that the request at operation 301 is associated with a cyberattack, fraud, and/or an automated system instead of a human.

Some exemplary indicators that client device is not operated by the human may be how quickly a username and/or password is entered into a data entry field. A human user would take some time, while a scripted robot would be able to enter information at an inhuman speed. In some examples, a combination of different indicators from the telemetry data in a certain pattern may cause the system to determine that the client device is not being operated by a human. When these patterns occur, the system may filter out those requests and continue to operation 311B where the request received at operation 301 is ignored or an additional human check occurs (similar to operation 311 of FIG. 3A discussed above).

In some examples, process 300B may have operation 311B, which may be a modified version of operation 311 of FIG. 3A, wherein system updates filter 323 for client device requests that successfully passed initial filter 323 but failed to provide a correct solution at operation 310. At operation 311B, when the system determines that the request at operation 301 is part of a cyberattack for failing to provide a correct solution at operation 310 and/or fails an additional manual test provided during operation 311B (similar to the manual test discussed above for operation 311 of FIG. 3A), the system may provide the telemetry data collected at 323 to a risk analysis server, such as one or more servers of risk analysis server pool 150 of FIG. 1. As discussed above, risk analysis server may a server configured to review and/or analyze requests and communications from client devices and determine whether any of the requests and communications are fraudulent, by an automated system, and/or part of a cyberattack. In some examples, the risk analysis server may implement one or more fraud detection algorithms and/or machine learning algorithms to detect fraudulent actions and/or cyberattacks. In some examples the system may tag the telemetry data as being associated with a cyberattack or an automated system, and the telemetry data may be provided to the risk analysis server to identify patterns in the telemetry data. The risk analysis server may apply one or more classifiers and machine learning algorithms to find patterns in the telemetry and then update the filter of operation 323 with telemetry data patterns that the sever determines are associated with a cyberattack or an automated system. In this manner, the filter of operation 323 evolves and gets better at filtering out requests associated with cyberattacks and/or automated system. Furthermore, operation 323 increases the efficiency of operation 300B, as more requests associated with cyberattacks and/or automated systems will skip operations 305-310, which may be more computational resource intensive. Additionally, the separation of the risk analysis server and/or functionality from the system employing process 300, allows process 300 to be implemented efficiently with a rapid response. The resources of the system operating process 300 would not need to be shared with a system implementing a resource intensive analysis that a machine learning system would employ. However, in some embodiments, the risk analysis server may be combined with the system operating process 300B.

Figure 4:
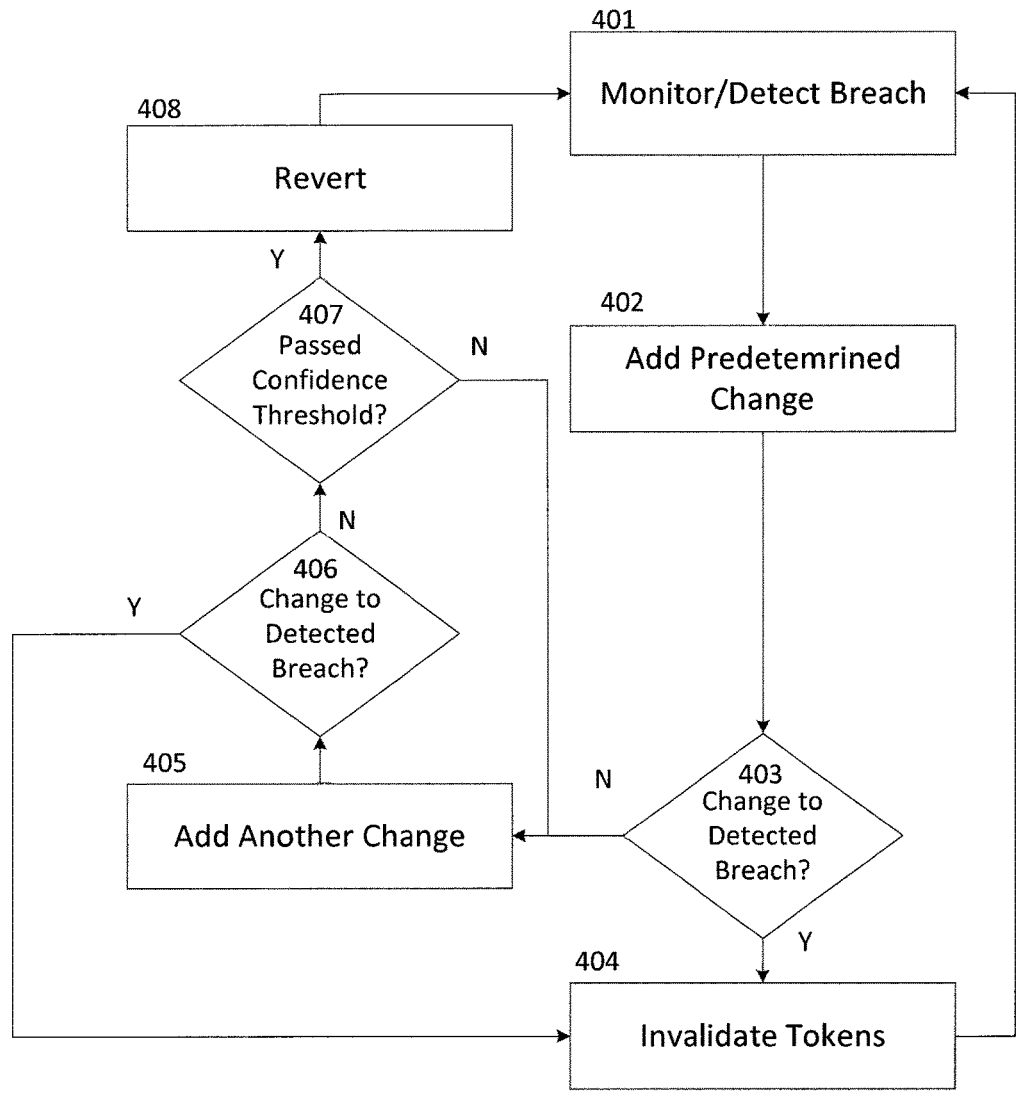
FIG. 4 is a flow diagram illustrating an exemplary process for updating cyberattack preventive measures in response to identifying or determining a breach of security.

FIG. 4 illustrates an exemplary process 400 implemented by a system for updating cyberattack preventive measures in response to identifying or determining a breach of security. Process 400 may be implemented on a system such as one or more of the systems in computing environment 100 of FIG. 1, such as network-based system 110, according to some embodiments. In some examples, process 400 may be implemented on one or more of the server pools of FIG. 1, such as frontend server pool 120, user profile server pool 131, payment settings server pool 132, security token server pool 133, risk analysis server pool 150, and/or the like. In some examples, process 400 may be implemented in its own separate server or server pool. In some examples, process 400 may be distributed over several server pools.

In some examples, process 400 may include operation 401 for detecting a breach of the cyberattack prevention system. The system may monitor certain indications for detecting a breach. In some examples, the indications that the system may monitor may be indicators associated with the particular type of attack that the cyberattack prevention system is configured to prevent. For example, if the cyberattack was associated with a distributed denial of service attack, the system may monitor network traffic, server loads, server resources, memory availability, number of requests, numbers of a particular type of requests (e.g., login requests, user query, etc.), number of unique devices in communication with the system within a time period, number of requests from a particular location or location category (e.g., California, United States, all of America, Europe, China, etc.), server response times, and/or the like. A spike in one or more of those metrics may cause the system to determine that a distributed denial of service attack is occurring. The system may determine an average value for each metric that the system is monitoring and determine if and/or when a predetermined deviation of the average occurs. In some examples, the system may monitor for a predetermined deviation from the average within a predetermined about of time. For example, the threshold may be a 100% or more increase or a 50% decrease and the predetermined amount of time may be a few milliseconds, seconds, minutes, hours, etc. In some examples, the system may look for sustained spikes, such as spikes that last longer than a threshold length of time. In some examples, certain metrics may regularly have large spikes, and the system may identify when a spike is abnormal. The system may determine when a spike or change in metrics is beyond one or more standard deviations from the mean, mode, or other value.

Additionally, certain types of cyberattacks may have signatures based on one or more metrics, and the system may determine whether a cyberattack is occurring by monitoring for the signature. The signature may be a particular combination of metrics. For example, network traffic numbers may be proportional to the number of client devices connected, but certain cyberattacks may change that proportionality. Thus, a signature for a cyberattack may be determined based on the relationships between monitored metrics.

In some examples, process 400 may include operation 402 that introduces a change to the cybersecurity system. In some examples, operation 402 may be in response to operation 401. In some examples, the change may be a software update. The system may have preprogrammed updates to the cybersecurity system developed for defending a breach of a currently implemented cybersecurity system. For example, the system may have several updates on how problems are solved, the types of problems used, how things are encrypted, how information is communicated, what information is requested, changes to existing problems, and/or the like. For example, initially the system may use a randomly generated constant for solving problems, and the system may update to using a random constant that is related to information about the client device. Another second update may be that the device has to solve a problem to obtain the random constant. The system may have several predetermined updates to implement into the system. In some examples, the cybersecurity system may have multiple or redundant servers such that one server can be taken down and updated while the other server handles the cybersecurity, and upon finishing the update, switch traffic back to the updated server. In this manner, the system avoids service down time.

Furthermore, by updating with new changes to the cybersecurity after the system detects and/or determines a breach is occurring, the system applies new, unknown, and increasingly difficult security measures to defend against cyberattacks. An attacker may create a sophisticated cyberattack after researching the system, but the attacker would not have the ability to research how the system will conduct an update because the update will not have been implemented or public yet. As such, the user would have to change the attack to account for the cybersecurity update almost immediately after a temporary successful attack on this system. Having unknown updates triggered by successful attacks on the system allows for the cybersecurity system to implement new and evolving defenses without publicizing the evolution for analysis. An attacker would only, at best, be able to determine the strength of the current public face of the security system, but not the hidden stronger and more evolved system that is ready to be rapidly implemented upon a successful attack.

In some examples, process 400 may include operation 403. At operation 403, the system may make a determination whether the change to the cybersecurity system has prevented the detected breach. For example, the system may check whether the monitored indicators go back to normal, below the threshold, and/or back to the average. In some examples, the system may identify if a significant change occurred to the monitored indicators by the update, such as a threshold change toward the average used in operation 401 (e.g. 40% change, or another percentage) and/or whether the change causes the metrics user in operation 401 to be within the threshold deviation used in operation 401. Operation 403 may be a mechanism for which the system determines whether a cyberattack is actually occurring, or whether there is an anomaly causing the change to the monitored indicators detected at operation 401. For example, a viral link, news source, trending social media event, trending global event, and/or the like may cause a spike in internet traffic or other metrics that could mirror a cyberattack signature. Because the update or changes to the cybersecurity system at operation 402 is targeted to prevent a cyberattack, the update should not or minimally affect the monitored indicators during a non-cyberattack anomaly and/or event.

In some examples, if the system detects, at operation 403, that a meaningful change occurred to the monitored indicators, the system may determine that the update successfully countered the cyberattack. At operation 404, which may be responsive to the system determining that a cyberattack was successfully mitigated at operation 403, may invalidate any tokens the system may have provided to skip one or more security measures, such as the tokens provided at operation 312 of FIG. 3A. Thus, systems that may have fraudulently received tokens by breaching the old security system would not be allowed to skip through the updated security system (e.g. the one or more operations of process 300A of FIG. 3A).

In some examples, responsive to the system not detecting that a meaningful change occurred at operation 403, the system may implement another update at operation 405 and in some examples, again detect whether a meaningful changed occurred at operation 406. In some examples, a security attack may be robust enough to overcome one or more updates, therefore additional updates may be implemented as a form of confirming that the detected breaches at operation 401 are due anomalies rather than a cyberattack.

In some example, the system may select the update conducted at operation 405. For example, the system may determine which of the updates is the most different to the type of update conducted at a previous operation, such as operation 403, or a previous execution of operation 405.

In some examples, if a meaningful change is detected at operation 406, the system may continue to operation 404. In some examples, if a meaningful change has not occurred, the operation may continue to operation 407 wherein the system may determine whether a threshold confidence that the breach detected at operation 401 is an anomaly or natural event rather than a cyberattack. In some examples, the threshold confidence may be based on the number of updates the server has made to the cybersecurity system (such as four updates). The system may keep a count for how many updates have occurred.

In some examples, responsive to the confidence level not being passed at operation 407, the system may continue back to operation 405 to conduct another update. In some examples, the system, in response to the confidence level being passed at operation 407, may continue to operation 408. In some examples, operation 408 may revert all of the updates, as they were being implemented against an anomaly unassociated with a cyberattack. Since a cyberattack was not occurring, the security updates that are implemented by the system are still likely to unknown. Thus, those updates can be saved for real cyberattacks later on. In some examples, for extra security, the system may skip operation 408, as the temporary update may provide some public disclosure of the changes the system made.

In some examples, in response to operations 408, 407 (when operation 408 is skipped), or 404, the system may continue to operation 401 wherein the system monitors for new security breaches.

There are many other organizations, permutations, and implementations of the operations in process 400, which are all contemplated herein. For example, a possible permutation to process 400 may be to remove or skip operations 405-408 and implement operations 401, 402, and possibly 404. Other permutations may remove or skip operation 404 and continue straight to operation 401 instead, such as systems that do not implement a security token. Many other permutations are possible without deviating from the spirit of process 400, all of which are contemplated herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on implementing a cyberattack defense system on servers; however, it may also be implemented on a network device, such as a router or switch. Furthermore, the system may be implemented in different network environments, such as on one or more gaming service provides, social media service provides, and/or the like. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A system comprising:
a non-transitory memory storing instructions; and
one or more hardware processors coupled to the non-transitory memory and configured to read the instructions from the non-transitory memory to cause the system to perform operations comprising:
monitoring metrics associated with network communications;
determining that one or more of the metrics has deviated from an average;
in response to determining the deviation from the average, updating a cyber defense system with a predetermined update; and
removing the predetermined update in response to determining that the deviation from the average is not part of a cyberattack.

2. The system of claim 1, wherein determining that the deviation from the average is not part of the cyberattack comprises:
updating the cyber defense system with at least a second predetermined update; and
determining that the deviation from the average has not changed after updating the cyber defense system with the predetermined update and the second predetermined update.

3. The system of claim 1, wherein determining that the deviation from the average is not part of the cyberattack is based on a confidence score.

4. The system of claim 3, wherein the confidence score is based on a number of updates made to the cyber defense system in response to determining the one or more metrics has deviated from the average.

5. The system of claim 1, wherein determining that the deviation from the average is not part of a cyberattack is based at least in part on determining that the one or more metrics are beyond a threshold deviation from the average after the updating.

6. The system of claim 1, wherein the operations further comprise:
 determining that the predetermined update did not affect the one or more metrics that has deviated from the average, and in response, implementing a second predetermined update.

7. The system of claim 6, wherein implementing the second predetermined update is also in response to determining that a cyberattack confidence was not passed after implementing the predetermined update.

8. A method comprising:
 monitoring metrics associated with network communications;
 determining that one or more of the metrics has deviated from an average;
 in response to determining the deviation from the average, updating a cyber defense system with a predetermined update; and
 removing the predetermined update in response to determining that the deviation from the average is not part of a cyberattack.

9. The method of claim 8, wherein determining that the deviation from the average is not part of the cyberattack comprises:
 updating the cyber defense system with at least a second predetermined update; and
 determining that the deviation from the average has not changed after updating the cyber defense system with the predetermined update and the second predetermined update.

10. The method of claim 8, wherein determining that the deviation from the average is not part of the cyberattack is based on a confidence score.

11. The method of claim 10, wherein the confidence score is based on a number of updates made to the cyber defense system in response to determining the one or more metrics has deviated from the average.

12. The method of claim 8, wherein determining that the deviation from the average is not part of a cyberattack is based at least in part on determining that the one or more metrics are beyond a threshold deviation from the average after the updating.

13. The method of claim 8, further comprising:
 determining that the predetermined update did not affect the one or more metrics that has deviated from the average, and in response, implementing a second predetermined update.

14. The method of claim 13, wherein implementing the second predetermined update is also in response to determining that a cyberattack confidence was not passed after implementing the predetermined update.

15. A non-transitory machine readable medium having stored thereon machine readable instructions executable to cause a machine to perform operations comprising:
 monitoring metrics associated with network communications;
 determining that one or more of the metrics has deviated from an average;
 in response to determining the deviation from the average, updating a cyber defense system with a predetermined update; and
 removing the predetermined update in response to determining that the deviation from the average is not part of a cyberattack.

16. The non-transitory machine readable medium of claim 15, wherein determining that the deviation from the average is not part of the cyberattack comprises:
 updating the cyber defense system with at least a second predetermined update; and
 determining that the deviation from the average has not changed after updating the cyber defense system with the predetermined update and the second predetermined update.

17. The non-transitory machine readable medium of claim 15, wherein determining that the deviation from the average is not part of the cyberattack is based on a confidence score.

18. The non-transitory machine readable medium of claim 17, wherein the confidence score is based on a number of updates made to the cyber defense system in response to determining the one or more metrics has deviated from the average.

19. The non-transitory machine readable medium of claim 15, wherein determining that the deviation from the average is not part of a cyberattack is based at least in part on determining that the one or more metrics are beyond a threshold deviation from the average after the updating.

20. The non-transitory machine readable medium of claim 15, further comprising:
 determining that the predetermined update did not affect the one or more metrics that has deviated from the average, and in response, implementing a second predetermined update.

\* \* \* \* \*